Aug. 5, 1924.
C. E. SMALLEY
SUPPORT
Filed July 30, 1923
1,504,154
Fig. 1.
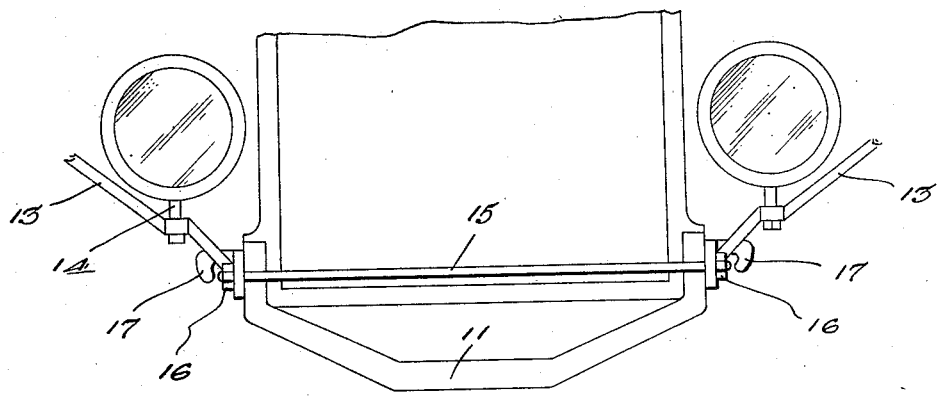
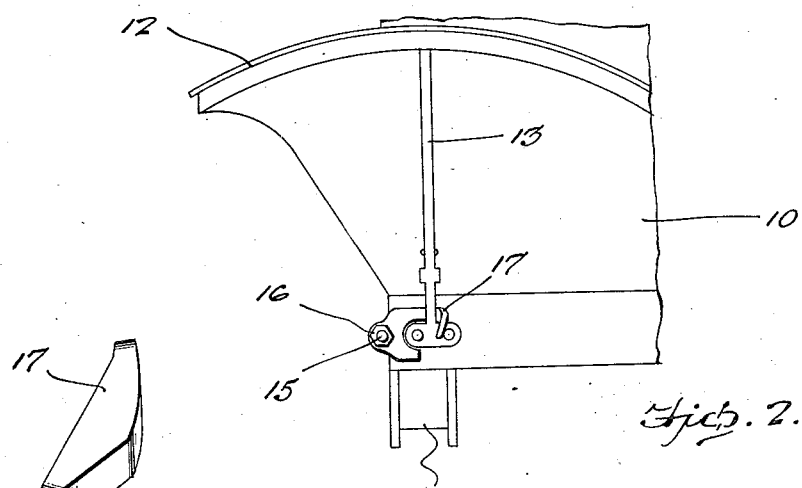
Fig. 2.
Fig. 3.
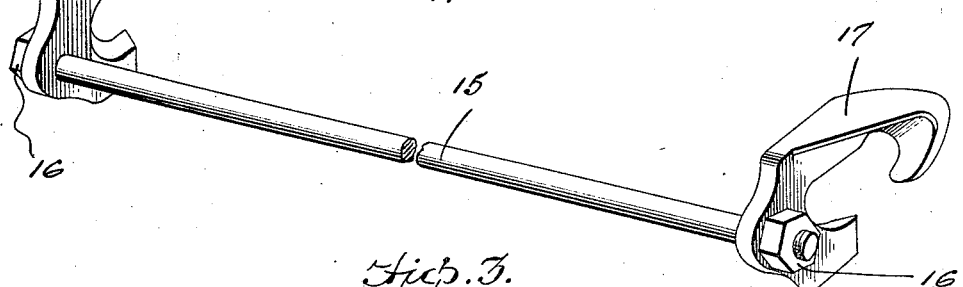
C. E. Smalley INVENTOR
BY *Victor J. Evans*
ATTORNEY
WITNESS:

Patented Aug. 5, 1924.

1,504,154

UNITED STATES PATENT OFFICE.

CHARLES E. SMALLEY, OF SIOUX CITY, IOWA.

SUPPORT.

Application filed July 30, 1923. Serial No. 654,681.

*To all whom it may concern:*

Be it known that I, CHARLES E. SMALLEY, a subject of the King of Great Britain, residing at Sioux City, in the county of Woodbury and State of Iowa, have invented new and useful Improvements in Supports, of which the following is a specification.

This invention relates to a truss for automobiles, and contemplates an improvement in Patent Number 1,424,685, issued to me on August first, nineteen-twenty-two. The invention aims to eliminate a number of parts described in said patent, and consequently simplify the construction with the advantage of reducing its cost in manufacture, as well as making it easier to apply to the vehicle.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a fragmentary front elevation of a vehicle showing the invention applied thereto.

Figure 2 is a fragmentary side elevation.

Figure 3 is a perspective view of the parts constituting the invention assembled.

The invention is primarily intended for use on automobiles of the Ford type, and upon reference to the drawing, it will be noted that 10 represents the frame of the vehicle having a curved cross member 11 which connects the side members of the car as will be readily understood. Arranged between the underside of each fender 12, and secured to the latter and the cross member 11 is an inclined fender iron 13, which supports lamp brackets 14 as shown.

The invention is in the nature of a truss to brace the front cross member 11, and consists in a truss rod 15, which is arranged transversely across the front of the vehicle as shown in Figure 1. This truss rod is threaded at both ends to accommodate adjusting nuts 16, while mounted on the rod between the nuts is a pair of hook like elements 17. The body portions of the hook like elements are of course arranged substantially parallel and are adapted to bear against the opposed side members of the frame 12, while the hook terminals of each of such elements projects relatively at a proper degree of inclination to receive and engage the adjacent brace iron 13. By simply loosening the nuts on the truss rod, the hook like elements can be properly associated with the brace irons whereupon the nuts are subsequently tightened to move the elements into operative association with said brace irons in a manner wherein the parts are held immovable relatively.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

The combination with an automobile frame and a pair of fender irons, each having a relatively broad attaching portion secured to the frame, of a pair of substantially U-shaped members arranged to straddle one end of each attaching portion of said irons, the intermediate portion of each element projecting beyond the forward end of the frame and provided with an opening, a rod arranged transversely across the fender of the frame and received by said openings, nuts threaded on the ends of said rod, each element including a relatively long limb terminating to provide an obliquely disposed hook like extremity adapted to extend downwardly over the attaching portion of the adjacent fender iron, whereby the truss rod is supported on the frame.

In testimony whereof I affix my signature.

CHARLES E. SMALLEY.